Feb. 28, 1967  M. G. BAYS  3,306,391
PORTABLE SEISMIC TRANSDUCER
Filed March 16, 1964  4 Sheets-Sheet 1

INVENTOR.
Marvin G. Bays
BY William J. Weller
Attorney

INVENTOR.
Marvin G. Bays
BY
William J. Miller
Attorney

INVENTOR.
Marvin G. Bays
BY
William J. Wille
Attorney

# United States Patent Office 3,306,391
Patented Feb. 28, 1967

3,306,391
PORTABLE SEISMIC TRANSDUCER
Marvin G. Bays, Ponca City, Okla., assignor to Continental Oil Company, Ponca City, Okla., a corporation of Delaware
Filed Mar. 16, 1964, Ser. No. 352,228
13 Claims. (Cl. 181—.5)

The present invention relates to the art of seismographic surveying, and more particularly, but not by way of limitation, relates to an improved transducer of the type used to generate continuous seismic signals having either constant or sweep frequencies.

In recent times, many seismic surveying systems use a continuous wave seismic signal generated in the earth by a vibrator or seismic transducer. These transducers generally comprise a base plate for engaging the surface of the earth, a reaction mass of from several hundred to several thousand pounds, and a suitable linear actuator, usually hydraulic, for reciprocating the reaction mass relative to the base plate through a short stroke at the predetermined frequency. The equal and opposite force of reaction reciprocates the base plate through a short vertical stroke at a corresponding frequency, thereby moving the surface of the earth and inducing the desired seismic signal in the earth.

It is very important that the base plate be coupled to the ground, i.e., maintained in contact with the ground, during the entire seismic wave generation cycle. Otherwise, the seismic signal will be distorted and will be unsatisfactory for geophysical purposes. Further, if any portion of the base plate loses contact with the ground, damage to the transducer frequently results.

As a practical matter the transducer must be readily portable and the transducer is customarily mounted on a standard truck, although various elaborate and expensive specially designed vehicles have been used. When transported by a standard truck, the transducer has heretofore been positioned at the rear end of the bed on which the necessary hydraulic power and electrical control equipment may be mounted, and behind the rear wheels. The base plate is then raised and lowered by a suitable hydraulic overhead lift assembly which includes two vertical posts, the lower ends of which are connected to the ends of the base plate by suitable vibration isolation linkage means. When the posts are raised, the base plate and transducer are raised for transport. When the posts are lowered, the base plate is pressed against the ground and the rear wheels of the vehicle are usually raised off the ground to apply a portion of the weight of the truck as a static load on the base plate.

In general it is necessary to apply a static load or holddown force on the base plate which is approximately 1.5 times as great as the maximum upward force exerted on the base plate during operation of the transducer, and this static load must be applied without appreciably interfering with the motion of the base plate or without transmitting appreciable vibration to the truck. Since it is desirable to generate as much seismic energy as possible with the transducer, high forces must be exerted on the base plate by reciprocation of the reaction mass. When the transducer is located behind the rear wheels of the truck, only 50–60% of the weight of the truck can be applied to the base plate. Therefore, additional weight, such as lead ballast, is added to the rear of the truck in an attempt to increase the static load. This in turn requires a larger, more expensive truck and the purchase of the ballast weight.

The problems of designing and constructing an efficient, economical, highly portable transducer is further complicated by the fact that the transducer sometimes must be operated on ground having a slope as high as 15° in any direction relative to the longitudinal axis of the truck. Since the resilient isolation system between the vertical post and the ends of the base plate provide the only linkage between the truck and the transducer, the center of gravity of the truck usually shifts laterally when the rear wheels are raised from the ground, and the static load applied on one end of the base plate is materially reduced. As a result, one end of the base plate tends to come uncoupled from the ground during operation of the transducer and the entire transducer oscillates about the opposite end of the base plate. This not only distorts the seismic signal induced in the earth to the point that it is unsuitable for seismographic purposes, but also results in severe lateral vibration forces being imposed on the vibrator transducer or vibrator assembly. For this reason, considerable effort has heretofore been made to design a low profile vibrator having a low center of gravity so as to reduce the likelihood that one end of the base plate would come uncoupled from sloping ground.

In accordance with the present invention, a seismic transducer assembly having a greater force output for a given total weight is provided. The assembly can be summarily described, without intending to limit the invention at this time, as comprising a standard truck having a novel transducer suspended by a novel lift system between the front and rear wheels of the truck. This arrangement utilizes a greater portion of the weight of the truck as a static load and thereby either reduces the truck size required, or increases the amplitude of the seismic signal which can safely be generated on a slope without danger of decoupling. It has also been discovered that rather than keeping the center of gravity as low as possible, the center of gravity of the transducer should be as high above the base plate as practical in order to increase the rotational moment of inertia of the transducer and thereby reduce the likelihood that one end of the base plate will decouple from the ground.

In accordance with a more specific aspect of the present invention, a standard truck having front and rear wheels and a longitudinally-extending driveshaft for driving the rear wheels is used to transport a seismic transducer. The transducer has a base plate member for engaging the surface of the earth disposed between the front and rear wheels and below the driveshaft. A frame is connected to the base plate and extends to a point above the driveshaft. A reaction mass member is disposed above the driveshaft and is slidably connected to the frame for reciprocation through a relatively short vertical stroke. Suitable actuator means is provided for reciprocating the reaction mass relative to the frame and therefore relative to the base plate member to produce reciprocation of the base plate member. A lift system interconnects the ends of the base plate member and the truck for alternately lifting the base plate member from the ground for transport, and for pressing the base plate against the ground and loading the base plate with a portion of the weight of the vehicle. The positioning of the reaction mass above the driveshaft permits the base plate to be both raised and lowered and also raises the center of gravity of the transducer from the base plate such that the rotational moment of inertia of the transducer is materially increased and the decoupling tendency of the transducer reduced.

The present invention also contemplates various novel features of construction in the transducer, and in particular contemplates an improved lift system utilizing a pair of load-bearing columns, a pair of hydraulic lift cylinders and a hydraulic synchronizing system to insure coordinated movement of the columns without a mechanical interconnection between the columns. This lift system together with a novel transducer construction hereafter described in greater detail simplifies the lift system and permits easy assembly and disassembly of the transducer.

Therefore, an important object of the present invention is to provide an improved portable seismic transducer assembly.

Another object of this invention is to provide a seismic transducer assembly which has an increased energy output and a decreased overall weight.

Yet another object of the invention is to provide a transducer assembly of the type described which can be operated at higher energy levels on sloping ground without danger of decoupling.

Still another object of the present invention is to provide a transducer assembly of the type described which employs a standard truck and which is therefore economical to manufacture and operate.

Yet another object of the present invention is to provide an improved lift system which can be more economically manufactured and which will have a long service life.

A still further object of this invention is to provide a novel transducer having increased stability and freedom from decoupling when operated on sloping ground.

Another object of this invention is to provide a transducer assembly which can be easily disassembled for maintenance and repairs.

Many additional objects and advantages of the present invention will be evident to those skilled in the art from the following detailed description and drawings, wherein.

Figure 1:
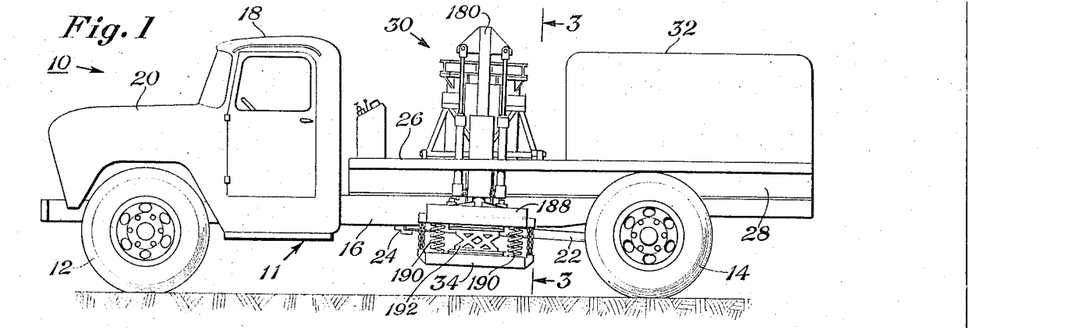
FIGURE 1 is a side elevation of a transducer assembly constructed in accordance with the present invention, with the transducer raised for transport.
Figure 2:
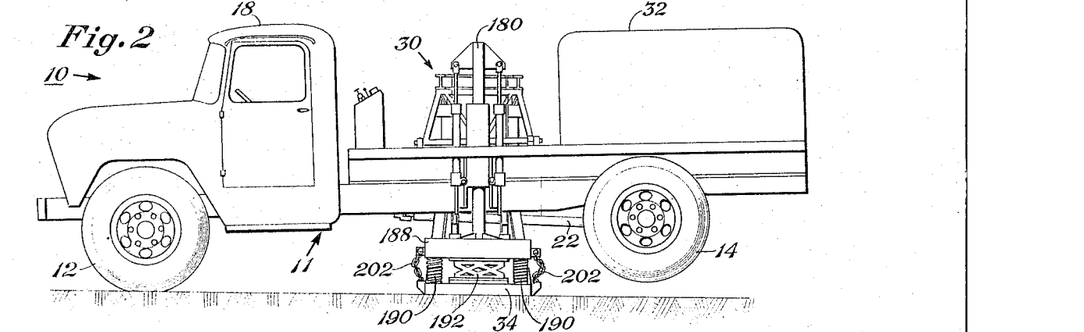
FIGURE 2 is a side elevation of the assembly of FIGURE 1 with the transducer lowered to the ground and positioned to generate a seismic signal.

Referring now to the drawings, an improved portable seismic transducer assembly is indicated generally by the reference numeral 10 in FIGURES 1 and 2. The assembly 10 is comprised of a standard truck 11 having front and rear wheels 12 and 14, respectively, which support a chassis comprised generally of frame channels 16, a cab 18, and a hood 20 which covers a conventional engine (not illustrated). The engine is connected to drive the rear wheels 14 by a conventional drive train including a driveshaft 22. If necessary, the drive train may be slightly modified by including a universal journal box 24 which may be connected to the frame 16 to raise the driveshaft 22. A bed 26 is connected to the channels 16 of the truck frame by a second set of reinforcing channels 28.

A novel seismic transducer indicated generally by the reference numeral 30 is disposed between the front and rear wheels and connected to the frame of the truck by a lift system presently to be described. A prime mover, hydraulic pump and associated hydraulic plumbing may be located on the bed 26 toward the rear of the truck as represented by the outline 32. The conventional springs interconnecting the axle of the rear wheels 14 and the vehicle frame are preferably replaced by some stiffer spring means such that when the rear of the vehicle is raised, as illustrated in FIGURE 2, the rear wheels will not lower relative to the vehicle chassis and the distance the transducer must be extended to raise the rear wheels clear of the ground will be reduced to a minimum.

Figure 3:
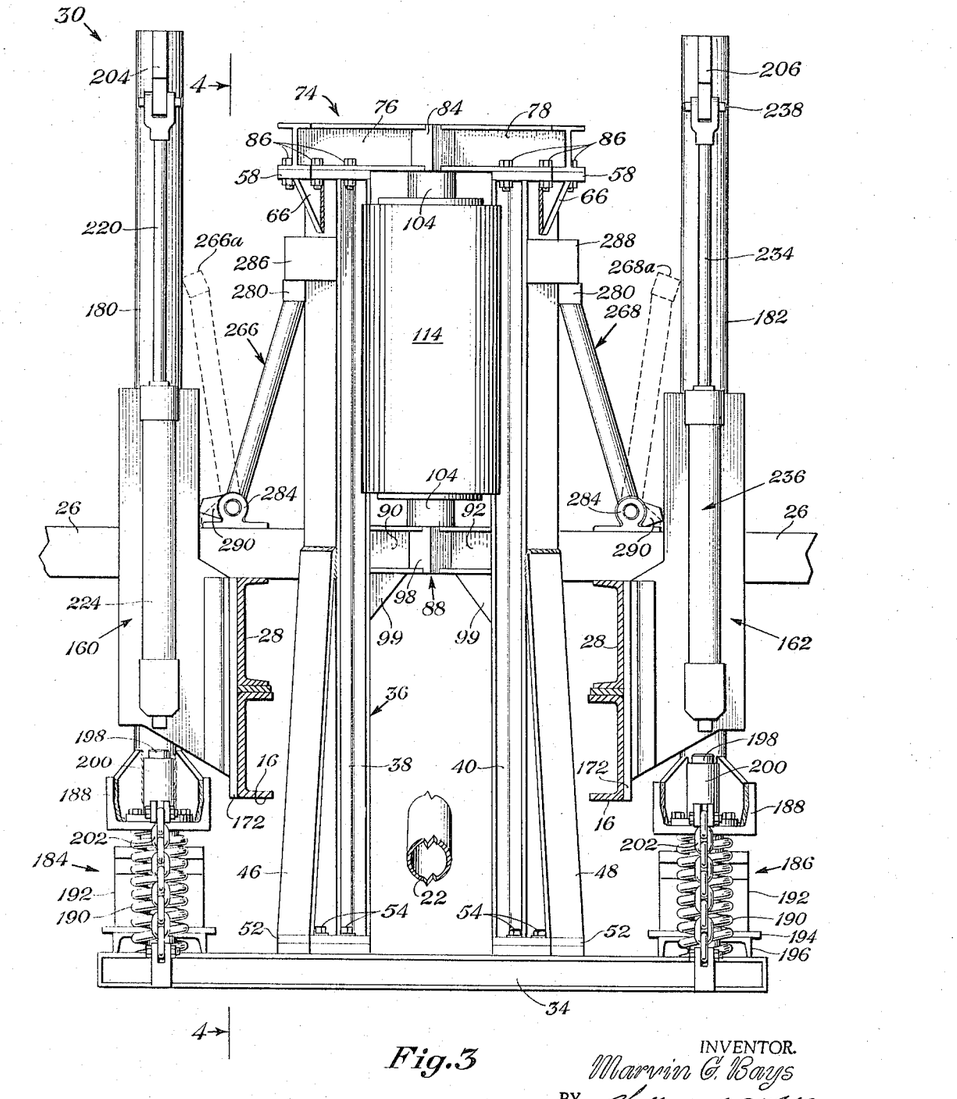
FIGURE 3 is a sectional view taken substantially on lines 3—3 of FIGURE 1, and is a rear view of a transducer constructed in accordance with the present invention.

Referring now to FIGURE 3, the transducer 30 is comprised of a base plate 34 which may be fabricated in any suitable manner, such as from channels or I-beams and plate materials to provide a flat, preferably rectangular lower face for engaging the surface of the ground. A transducer frame indicated generally by the reference numeral 36 extends upwardly from the base plate 34 to a point well above the driveshaft 22. The transducer frame 36 may conveniently be comprised of four vertically disposed I-beams 38, 40, 42 and 44. The lower halves of the four I-beams are reinforced and stiffened by gusset beams 46, 48 and 50, which are connected to the I-beams 38, 40 and 42 and a similar gusset beam (not illustrated) which is connected to the I-beam 44. The gusset beams may conveniently be fabricated from I-beams and have wedge-shaped web portions which are welded to the centers of the outer flanges of the respective I-beams, and flange portions connected to the wedge-shaped web portions. Bottom foot plates 52 are welded to the bottoms of the four vertical I-beams and gusset beams, and the frame is connected to the base plate member 34 by bolts 54. Top foot plates 58 are connected to the tops of the I-beams 38, 40, 42 and 44, respectively, and are braced by gusset plates 66.

Figure 4:
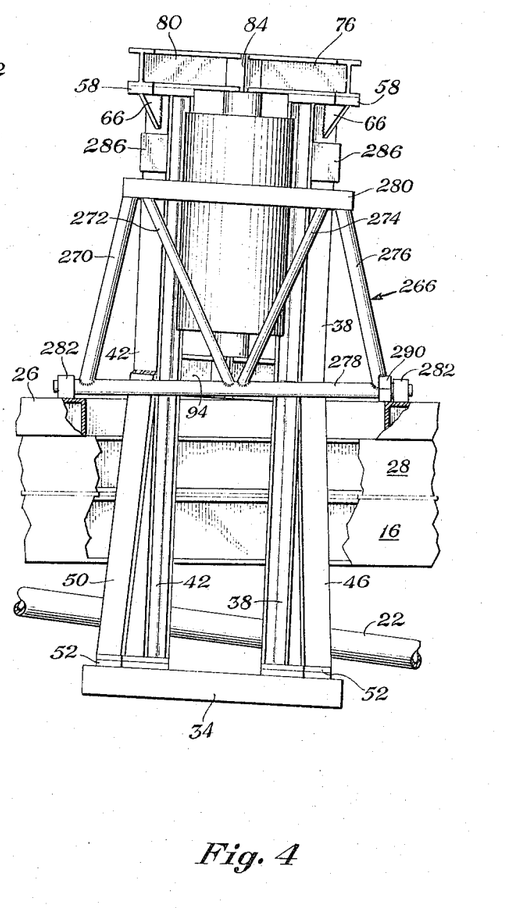
FIGURE 4 is a side view of a portion of the transducer assembly illustrated in FIGURE 1 with the lift system and a portion of the frame of the vehicle removed to show details of construction of the transducer.
Figure 5:
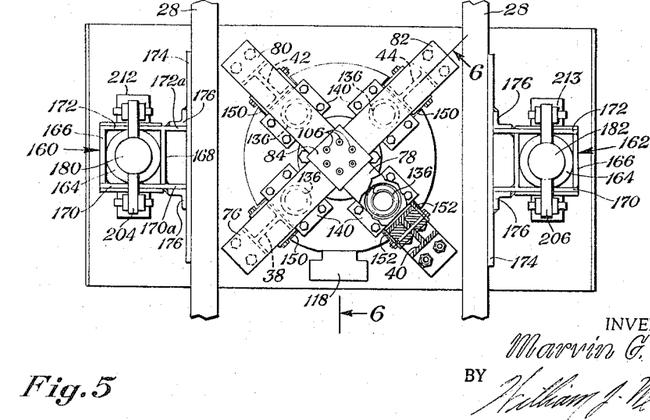
FIGURE 5 is a top view of a portion of the transducer assembly illustrated in FIGURE 1.

An upper spider member indicated generally by the reference numeral 74 is comprised of four I-beams 76, 78, 80 and 82, as can best be seen in FIGURE 5, which are welded to a central block 84. The outer ends of the I-beams of the spider 74 are bolted to the upper foot plates 58 by bolts 86. A lower spider, indicated generally by the reference numeral 88, is constructed similar to the spider 74 in that it is comprised of four I-beams 90, 92, 94 and 96, which can be seen in FIGURES 3, 4 and 5, which are welded to a central block 98. The outer ends of the I-beams 90, 92, 94 and 96 are welded to midpoints of the vertical I-beams 38, 40, 42 and 44, respectively, and are reinforced by gusset plates 99. The lower face of the upper central block 84 and the upper face of the lower central block 98 are provided with recesses 100 and 102, respectively, which receive the ends of a tubular double-rod-end piston member 104. The upper end of the piston member 104 is securely connected to the upper central block 84 by six countersunk Allen head screws 106. The lower end of the piston member 104 is similarly connected to the central block 98 by six Allen head screws 108. Thus it will be noted that the base plate member 34, the four upright I-beams 38, 40, 42 and 44, the upper spider 74, the lower spider 88, and the piston member 104 form a single rigid structure which, from a broad standpoint, may be considered as an earth coupling member.

The piston member 104 has a piston 110 which is slidably received within a cylinder 112 formed within a reaction mass indicated generally by the reference numeral 114. The piston 110 may be of any suitable conventional construction and may be provided with conventional piston rings for insuring a sliding, fluid-tight seal within the interior of the cylinder 112. The cylinder 112 may be formed within the reaction mass 114 by a plurality of sleeve inserts and sealing rings in a manner well known in the art. The various inserts and sealing rings are collectively represented by the simplified inserts 115 and 116. Hydraulic fluid is introduced to the cylinder 112 alternately on opposite sides of the piston 110 by a control valve 118 and upper and lower hydraulic ports 120 and 122. The inserts 115 and 116 may be retained in place by keeper plates 124 and 126, respectively, which may be bolted to the body 128 of the reaction mass member 114. Thus it will be evident that as hydraulic power fluid is introduced through the lower port 122 to the chamber formed within the cylinder 112 below the piston 110, the reaction mass 114 will be driven downwardly relative to the piston member 104, and therefore relative to the base plate 34. Conversely, when hydraulic power fluid is introduced through the upper port 120 into the cylinder above the piston 110, the reaction mass 114 will be driven upwardly. As the reaction mass is driven downwardly, an upwardly directed reaction force will be applied to the base plate, and when the reaction mass is driven upwardly, a downwardly directed reaction force will be applied to the base plate.

Figure 6:
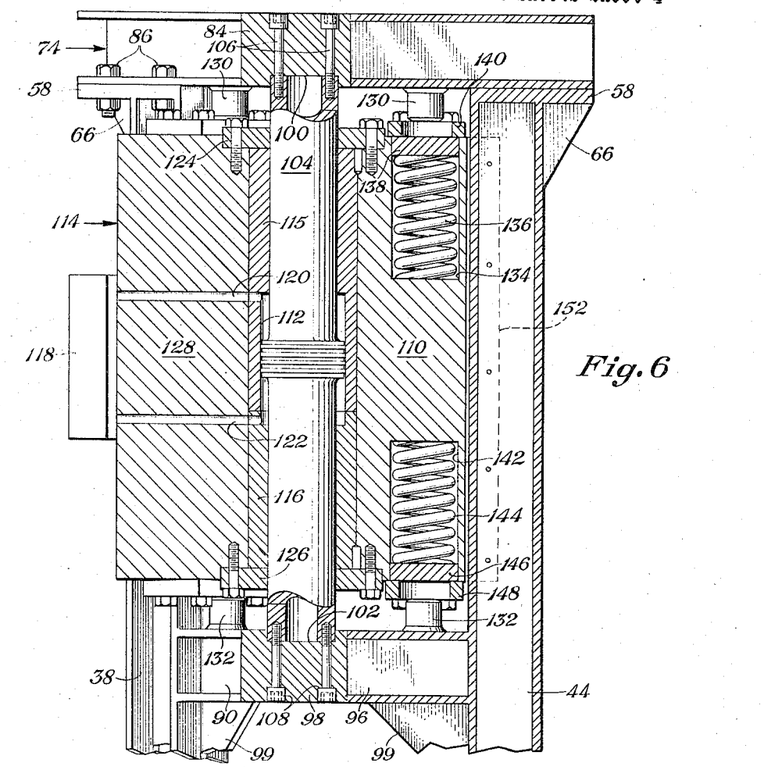
FIGURE 6 is a sectional view taken generally on lines 6—6 of FIGURE 5.
Figure 7:
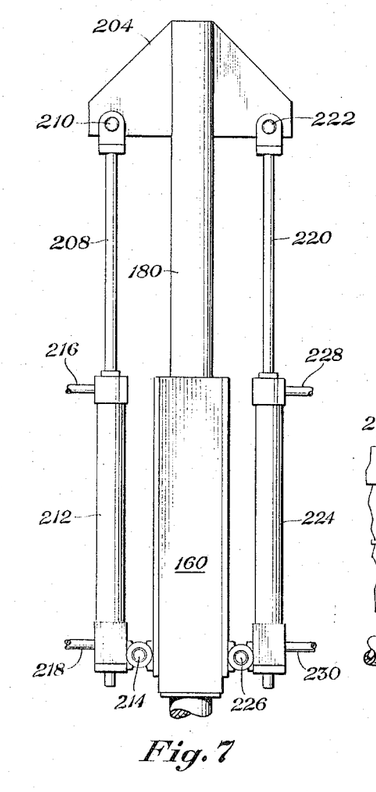
FIGURE 7 is a side view of a portion of the lift system of the transducer assembly of FIGURE 1.

In normal operation, reciprocation of the reaction mass 114 is maintained centered between the upper and lower spiders 74 and 88 by a suitable electrical control system (not illustrated). However, to guard against the eventuality that the reaction mass member 114 may become uncentered and strike either of the spiders, four bumper studs 130 extend downwardly from lower faces of the I-beams of the upper spider 74, and a similar set of four bumper studs 132 extend upwardly from the upper faces of the I-beams of the lower spider 88. The reaction mass member 114 is provided with an upper set of wells 134 (only one of which is illustrated in FIGURE 6) which are oriented in alignment with each of the bumper studs 130. A coil spring 136 is positioned in each of the wells 134 and biases a striker plate 138 outwardly from the well against a keeper plate 140 which is bolted to the body 128 of the reaction mass. The keeper plate 140 has an aperture for receiving the bumper stud 130 which will engage the striker plate and compress the coil spring if the reaction mass travels too far up the piston member. The orientation of the coil springs 136 relative to the I-beams of the upper spider 74 can best be seen in FIGURE 5. A similar set of wells 142 are disposed in the lower face of the body 128 of the reaction mass 114 in alignment with the bumper studs 132 and receive coil springs 144 and striker plates 146 which are retained within the wells by apertured keeper plates 148.

It is important that the reaction mass member 114 be prevented from rotating around the piston member 104. This is accomplished by providing longitudinally-extending grooves 150 in the outer face of the cylindrically-shaped body 128 which receive the vertical I-beams 38, 40, 42 and 44. Brass bearing plates 152 may be secured to the sides of the respective I-beams to provide a smoothly working bearing surface between the reaction mass and the I-beams.

A synchronized hydraulic lift system interconnects the transducer 30 and the vehicle chassis. The lift system is comprised of two identical units disposed on opposite sides of the transducer. Two journal sleeve assemblies of substantially identical construction are indicated generally by the reference numerals 160 and 162. The journal sleeve assemblies are each comprised of a sleeve 164 which is secured within a welded box construction comprised of side plates 166 and 168 and end plates 170 and 172. The end plates have extended portions 170a and 172a, respectively, which are connected to a fifth plate 174 by angle iron strips 176. The plate 174 may be bolted, welded, or otherwise secured to the channels 16 and 28 of the truck frame so as to rigidly position the respective sleeves 164 relative to the vehicle frame. As will hereafter become more evident, the journal sleeve assemblies 160 and 162 transmit all horizontal loads between the truck and the transducer.

Columns 180 and 182 are slidably received within the respective sleeves 164 of the sleeve assemblies 160 and 162. The lower ends of the columns 180 and 182 are connected to the ends of the base plate 34 by vibration isolation means 184 and 186, respectively. The function of the vibration isolation means 184 and 186 is to apply a static hold-down load to the ends of the base plate 34 while permitting free vertical reciprocation of the base plate relative to the truck and also for transmitting a tension force from the vertical columns 180 and 182 to the base plate 34 so that the transducer 30 can be lifted for transport. Accordingly the vibration isolation means 184 and 186 may be of any suitable construction but are preferably of the type described and claimed in copending U.S. application Serial No. 352,027, filed on March 16, 1964, and assigned to the assignee of the present invention. This type of isolation means is illustrated in the attached drawings and each includes a crosspiece 188 which is connected to the lower end of the respective columns 180 and 182. A pair of coil springs 190 are disposed between the ends of the crosspiece 188 and the base plate 34 as can best be seen in FIGURES 1 and 2. A body of resilient material 192 is connected to the base plate by means of a plate 194 and channel 196. A pair of studs 198 are connected to the top of the resilient body 192 and are slidably received in sleeves 200 which are connected to the crosspiece 188. A pair of chains 202 interconnect the ends of the crosspiece 188 and the base plate 34 and provide a tension means for lifting the base plate 34 and therefore the transducer 30 when the columns 180 and 182 are raised as will hereafter be described.

When a load is applied to the base plate 34 through the vibration isolation means 184 and 186, the coil springs 190 and the resilient body 192 are compressed and apply a static load to each end of the base plate 34. Yet the base plate 34 is free to reciprocate because of the resilience of the coil springs 190 and resilient body 192 and no appreciable vibration is transmitted to the truck. The resilient body 192 and the sliding connection between the studs 198 and sleeves 200 transmit lateral or horizontal loads between the base plate and the columns 180 and 182.

Upper crosspieces 204 and 206 are connected to the upper ends of the columns 180 and 182 respectively. The piston rod 208 of a hydraulic lift cylinder 212 is connected to the crosspiece 204 by a suitable clevis 210. The lower end of the lift cylinder 212 is connected to the lower end of the journal sleeve assembly 160 by a second clevis 214. Upper and lower hydraulic ports 216 and 218 are provided to introduce hydraulic fluid to the cylinder 212. A second lift cylinder 213 is similarly connected by clevis connections between the upper crosspiece 206 of the column 182 and the lower end of the journal sleeve assembly 162 and is provided with corresponding upper and lower hydraulic ports. The lift cylinders 212 and 213 provide a means for raising and lowering the transducer 30 and for pressing the base plate 34 against the ground as will hereafter be described.

Figure 8:
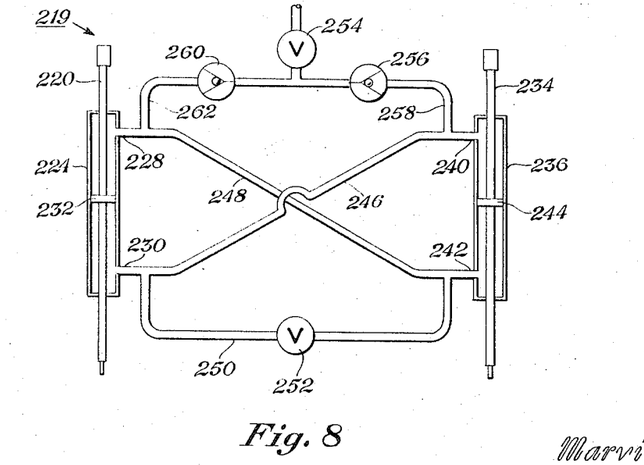
FIGURE 8 is a schematic hydraulic diagram of the synchronizing system of the lift system for the transducer of FIGURE 1; and, FIGURE 9 is a schematic drawing which serves to illustrate operation and advantages of the transducer construction shown in FIGURE 3.

A hydraulic synchronizing system for synchronizing the operation of the lift cylinders 212 and 213 and therefore the raising and lowering of the opposite ends of the base plate 34 is indicated generally by the reference numeral 219 and illustrated schematically in FIGURE 8. The synchronizing system is comprised primarily of two double-rod-end hydraulic cylinders 224 and 236 having upper hydraulic ports 228 and 240 which are cross-connected to lower hydraulic ports 242 and 230, respectively, by conduits 248 and 246. The conduits 248 and 246 are interconnected by a conduit 250 having a synchronizing valve 252 which can be manually opened to balance the fluid in the two halves of the synchronizing system as will hereafter be described in greater detail. Hydraulic make-up fluid can be added as needed to the conduit 246 from a source of fluid pressure through a manual valve 254, check valve 256 and conduit 258, and hydraulic make-up fluid can be added to the conduit 248 through the check valve 260 and conduit 262.

The piston rod 220 of the synchronizing cylinder 224 is connected to the crosspiece 204 by a clevis 222. The lower end of the cylinder 224 is connected to the lower end of the journal sleeve assembly 160 by a clevis 226. The upper end of the piston rod 234 of the synchronizing cylinder 236 is connected by a clevis 238 to the crosspiece 206 at the top of the column 182. The lower end of the cylinder 236 is connected by a clevis (not illustrated) to the sleeve assembly 162.

The synchronizing system may be placed in operative condition by filling the cylinders and all interconnecting lines with hydraulic fluid. This may be accomplished by opening the valve 254 and passing fluid under pressure through the check valves 256 and 260. It is important that no air be trapped in the system and suitable means should be provided for bleeding any air from the system. The cross connections provided by the conduits 246 and 248 between the upper port of each cylinder and the lower port of the other cylinder insures that movement of one of the synchronizing pistons will result in a corresponding or synchronized movement of the other synchronizing piston. Therefore, it is important that the pistons 232 and 244 be in the same position when the hydraulic fluid is introduced to the system. This can be accomplished by opening the synchronizing valve 252 to obtain equalized fluid volumes and pressures between the cylinders while the transducer is supported by the support frames 266 and 268.

A pair of support frames 266 and 268 are provided to support the transducer 30 in the raised position for transport without assistance from the hydraulic lift system. The support frames are of identical construction and each is comprised of tubular members 270, 272, 274 and 276, which are welded to a lower tubular axle member 278 and an upper tubular member 280 which may conveniently have a square cross section. The ends of the tubular axle members 278 are pivotally connected to the bed 26 of the truck directly over the truck frame by a pair of journals 282. A pair of dogs 286 are connected to the vertical I-beams 38 and 42, so as to engage the upper tubular member 280 and support the transducer at the proper height. A similar set of dogs 288 are connected to the I-beams 40 and 44 so as to uniformly support the transducer 30. Suitable ears 290 are connected to the frames 266 and 268 and so positioned as to limit the outward pivotal movement of the respective support frames to the positions indicated by the dotted outlines 266a and 268a in FIGURE 3. It will be noted that these positions are past the vertical so that the respective frames will not pivot back against the respective I-beams by gravity and prevent lowering of the transducer.

In operation, the portable seismic transducer assembly 10 is driven to the field with the transducer raised and supported by the frames 266 and 268. In this transporting position, the weight of the transducer, which is relatively light, is transmitted through the support frames to the bed 26 directly over the channels 28 and 16 of the frame of the truck. Upon reaching the field, the hydraulic power system is actuated and hydraulic power fluid is introduced through the lower parts of the cylinders 212 and 213 and the transducer 30 raised so that the support frames 266 and 268 can be disengaged and kicked out to the positions 266a and 268a. Gravity will retain the support frames in these positions so as not to interfere with subsequent raising and lowering of the transducer.

Next the hydraulic power fluid to the lift cylinders 212 and 213 is reversed so that the base plate 34 of the transducer is lowered to the surface of the ground, then the force of the hydraulic fluid above the pistons in the lift cylinders 212 and 213 creates a tension in the piston rods of the respective cylinders which raises the sleeve assemblies 160 and 162 and thereby lifts the truck until the rear wheels 14 clear the ground substantially as shown in FIGURE 2. As the transducer is lowered and the truck raised, the synchronizing cylinders 224 and 236 insure that both columns 180 and 182 are moved in synchronism even though the power exerted by the respective lift cylinders is unequal for any particular reason, such as will always occur when the transducer is positioned on a sloping surface. For example, assume that a vehicle is located on ground sloping from left to right. As the vehicle is lifted by applying a downward force on the columns 180 and 182 to compress the vibration isolation means 184 and 186, the weight of the vehicle tends to shift to the right due to the resiliency of the vibration isolation means and a greater load is applied to the right-hand column 182 and therefore to the right-hand lift cylinder 213. In such a case, the power exerted by the left-hand lift cylinder 212 is transmitted through the top crosspiece 204 to the piston 232 of the synchronous cylinder 224. High pressure fluid from below the piston 232 is then transferred through the conduit 246 to the top of the synchronous cylinder 236 to assist the right-hand lift cylinder 213 in raising the journal sleeve assembly 162 and the truck. Thus it will be noted that movement of either of the pistons 232 or 244 relative to the respective cylinders will result in a corresponding movement of the other piston, so that movement of either of the columns 180 and 182 will of necessity result in a corresponding movement of the other column.

After the base plate of the transducer is lowered to the ground and the vehicle raised as illustrated in FIGURE 2, the vibration isolation means 184 and 186 will be compressed such that the chains 202 will become loose and permit movement of the base plate 34 relative to the crosspiece 188. The combination resiliency of the coil springs 190 and the resilient body 192 provides a vibration isolation coupling which permits free movement of the base plate without a resulting movement of the columns 180 and 182 such that no vibration is transmitted to the truck. The lateral stiffness of the resilient bodies 192 is sufficient to support the lateral loads resulting from the shifting of the truck as a result of operation on sloping ground, and the lateral loads are transmitted through the sliding couplings formed by the stud members 198 and sleeves 200.

After the base plate 34 is statically loaded, hydraulic power fluid is introduced by the valve 118 alternately to the ports 120 and 122 so as to reciprocate the reaction mass 114 relative to the double-rod-end piston member 104. The valve 118 is shifted in synchronism with a control signal so as to cause the motion of the reaction mass 114 to be synchronized with the control signal. This results in a reaction force being transmitted through the piston member 104 to the frame comprised of the upper and lower spiders 74 and 88, and the four I-beams 38, 40, 42 and 44 to the base plate 34. Thus the base plate, and therefore the surface of the earth against which it is pressed, are reciprocated in synchronism with the control signal so as to induce the desired seismic signal in the earth.

The grooves 150 in the side of the reaction mass member 114 in which the four I-beams are positioned prevents rotation of the reaction mass so that flexible hydraulic connections to the valve 118 cannot become entangled and so that the necessary electrical position sensing and synchronizing circuits can be connected between the frame and the reaction mass. In each of these electrical systems, a probe is connected to the reaction mass and extends into suitable transformer coils or other suitable electrical circuit means. As a result of the position sensing means, the reaction mass 114 will, in normal operations, be reciprocated through a stroke centered about the piston member 104 and will contact the bumper studs 130 or 132 above and below the mass. However, in the event the reaction mass 114 does become uncentered during operation, the bumper studs 130 or 132 engage the striker plates 138 or 146, respectively, and the momentum of the reaction mass 114 is absorbed by the coils 136 or 144, as the case may be.

After the transducer has been operated through a sweep signal, the operation ceases. Hydraulic power fluid is then applied to the lower ports of the lift cylinders 212 and 213 so as to lower the rear wheels of the truck to the ground, then raise the base plate of the vibrator from the ground for transport to the next position. It is customary in field operations to repeatedly generate a series of seismic signals at closely spaced intervals so as to obtain the desired seismic information. Thus the entire operating sequence of lowering the transducer to the earth and raising the truck, generating the seismic sweep signal, lowering the truck and raising the transducer, and moving the truck forward a short distance may be accomplished in a matter of a few seconds.

An important aspect of the present invention is that a major portion of the weight of the truck can be applied through the resilient vibration isolation means 184 and 186 as a static load on the base plate 34 of the transducer. This is accomplished by reason of the location of the vibrator between the front and rear wheels 12 and 14 of the truck. In one embodiment of the invention, a total static load of 20,000 pounds was applied to the base plate by a truck and associated assembly having a total weight of only about 23,000 pounds. This compares with static loads on the order of 16,00 pounds for some previous seismic transducer assemblies in which the transducer was connected to the rear of the truck weighing 28,000 pounds.

The available static load is a limiting factor on the ultimate amplitude of the seismic signal which can be induced in the earth because the strength of the seismic energy is directly proportional to the force applied to reciprocate the base plate 34. Since it is essential that the base plate 34 be maintained in contact with the surface of the ground at all times in order to produce the desired seismic wave shape, a static load must be applied to the base plate that is greater than the upward force on the base plate. In practice, it is found that the hold-down force exerted on the base plate must be approximately 1.5 times as great as the force output of the vibrator or one end of the base plate may be decoupled from the ground during operation on sloping surfaces due to lateral displacement of the center of gravity of the truck and a reduction of the load applied to the high end of the base plate. When this occurs, the transducer assembly tends to oscillate about the isolation means at the other end of the base plate and this not only interferes with the generation of the seismic signal but results in severe transverse vibration loads on the columns 180 and 182 and therefore on the truck which the structure cannot tolerate. Thus the positioning of the transducer between the wheels of the vehicle so as to apply a greater portion of the weight of the vehicle to the transducer results in the ability to generate a seismic signal of greater output for a given vehicle weight and given slope on which the transducer is operated. A smaller truck can of course be purchased for a lower price than a larger one.

Another important aspect of this invention is that a standard truck having the motor at the front and a driveshaft extending longitudinally to the rear wheels may be used. This is made posssible by reason of the fact that the base plate 34 is disposed beneath the driveshaft 22 so that it can be lowered into contact with the ground, while the reaction mass 114 is disposed above the driveshaft. This permits the transducer to be centrally located and employ as much of the weight of the truck as possible as a static load. The lower spider 88 of the frame should be spaced above the base plate 34 a distance sufficient to permit the truck to be raised until the rear wheels 14 clear the ground without the driveshaft contacting the lower spider 88.

As previously mentioned, it has heretofore been considered highly desirable to position the reaction mass as close to the base plate as possible in order to lower the center of gravity of the transducer and thereby, it was believed, increase the stability of the transducer on sloping ground. However, I have discovered that the reaction mass 114 should be located as high as possible in order to raise the center of gravity of the transducer as high as possible above the base plate. This increases the rotational moment of inertia and reduces the likelihood that one end of the base plate will decouple from the ground. Of course the height of the transducer is limited by the clearance required when the transducer is in the raised position of FIGURE 1 and also by the fact that the frame connecting the transducer to the base plate should be sufficiently stiff as to have a natural frequency above the operating frequency of the transducer, which in turn is limited by the fact that the base plate assembly, including the frame and piston member, should be relatively light in weight as compared to the reaction mass so as to improve the frequency response of the transducer at higher frequencies.

Figure 9:
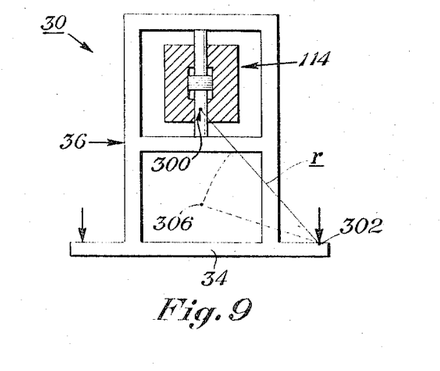

As can be seen in FIGURE 9, the greater the height of the center of gravity 300 of the transducer above the base plate 34, the greater the distance from the center of oscillation 302 which is the center of the static load applied by the isolation means 184 or 186 at the low end of the base plate. Since the moment of inertia I of a rotating body is equal to the mass of the body $m$ times the square of the distance $r$ from the center of rotation to the center of gravity of the body, it will be appreciated that the higher the center of gravity of the transducer above the base plate, the greater the distance $r$ and therefore the greater the moment of inertia resisting oscillation of the transducer about the end of the base plate.

By way of example, a transducer assembly constructed in accordance with the present invention had a center of gravity about four feet above the base plate. On the other hand, the rear-mounted low silhouette transducers heretofore used have a center of gravity 306 about two feet above the base plate. In such a case, it will be evident that the improved transducer has a moment of inertia over four times as great as the moment of inertia of previous transducers. This increased moment of inertia lessens the likelihood that one end of the base plate will decouple as a result of a shift of the center of gravity of the truck on a transverse slope.

The novel lift system for raising and lowering the transducer assembly 30 is particularly adapted to absorb transverse loads resulting from operation on sloping ground without adverse effects upon the various hydraulic cylinders. For example, the sleeve assemblies 160 are secured connected to the frame of the truck so that any transverse load applied to the columns 180 as a result of operating the device on unlevel ground will be absorbed entirely by the columns. This permits the lift and synchronizing cylinders and the respective rods to be clevismounted and thereby eliminate alignment problems. The resilient vibration isolation means 184 and 186 permit some disalignment of the columns 180 and 182 without adverse effects. The hydraulic synchronizing system insures that the columns will always be moved in synchronism regardless of uneven loads on the column and eliminates the necessity of mechanically interconnecting the two columns, which would of course require precise alignment of the columns. The elimination of a mechanical interconnect between the tops of the columns also permits ready access to the transducer assembly so that the reaction mass can be disassembled for repair. It will also be noted that when the greatest demands are made on the hydraulic lift cylinders 212 and 213, that is when the truck is raised to apply the static load to the base plate, the piston rods of the lift cylinders are under tension.

The base plate 34 can be disconnected from the frame so as to remove the transducer from around the driveshaft. However, this is not necessary when merely overhauling the cylinder means formed within the reaction mass because the synchronized lift system does not have the customary cross beam interconnecting the tops of the lift columns 180 and 182. Thus the bolts connecting the lower end of the piston member 104 to the lower spider 88 may be removed, the upper spider 74 disconnected from the vertical I-beams by removing the bolts 86, and the entire reaction mass assembly lifted from the remainder of the transducer.

Although a preferred embodiment of the invention has been described in detail, it will be appreciated by those skilled in the art that various changes, substitutions and alterations can be made in the specific components and combinations thereof without departing from the spirit and scope of the invention as defined by the appended claims.

What is claimed is:

1. A portable seismic transducer assembly comprising:
   a vehicle having front and rear sets of wheels and a driveshaft extending longitudinally of the vehicle for driving one set of the wheels;
   a base plate member for engaging the surface of the earth disposed below the driveshaft and between the front and rear wheels, the base plate member having a frame extending to a point above the driveshaft;
   a reaction mass member disposed above the driveshaft and slidably connected to the frame for reciprocation through a relatively short vertical stroke;
   means interconnecting the reaction mass member and said frame for reciprocating the reaction mass member through said stroke; and,
   lift means interconnecting the base plate member and the vehicle for alternately lifting the base plate member from the ground for transport and for pressing the base plate against the ground with at least a portion of the weight of the vehicle.

2. A portable seismic transducer assembly as defined in claim 1 wherein the lift means comprises:
   a pair of columns disposed vertically on opposite sides of the reaction mass member;
   vibration isolation means interconnecting the lower ends of the columns and the base plate member;
   journal means connected to the vehicle between the front and rear wheels and slidably receiving the columns for vertical movement;
   hydraulic motor means interconnecting each column and the vehicle for raising and lowering the columns relative to the vehicle; and,
   means connected to the columns for synchronizing movement of the columns.

3. A portable seismic transducer assembly as defined in claim 2 wherein the means for synchronizing movement of the columns comprises:
   a pair of hydraulic actuators each comprised of a cylinder member having a piston rod member reciprocally disposed therein, one member of each actuator being connected to the vehicle and the other member being connected to one of the columns, each cylinder member having upper and lower hydraulic ports;
   first conduit means in fluid communication with the upper hydraulic port of one of the cylinder members and the lower hydraulic port of the other cylinder member; and,
   second conduit means in fluid communication with the upper hydraulic port of said other cylinder member and the lower hydraulic port of said one cylinder member.

4. A portable seismic transducer assembly as defined in claim 1 wherein the base plate member and means interconnecting the reaction mass are comprised of:
   a horizontally disposed, elongated plate;
   at least two vertically disposed, spaced posts connected to the plate;
   an elongated, double-rod-end hydraulic piston member disposed vertically between the posts;
   a first member interconnecting the upper end of the piston member and the upper ends of the posts;
   a second member interconnecting the lower end of the piston member and intermediate points of the posts; and wherein
   the reaction mass member is reciprocally disposed around the hydraulic piston member and forms a hydraulic cylinder into which hydraulic power fluid may be ported to reciprocate the reaction mass relative to the piston member.

5. A portable seismic transducer assembly as defined in claim 4 wherein:
   the reaction mass member has at least one groove which receives a vertically-disposed post to prevent rotation of the reaction mass member about the piston member.

6. A portable seismic transducer assembly as defined in claim 4 further characterized by:
   at least one bumper stud connected to the first member and extending downwardly toward the reaction mass member;
   at least one bumper stud connected to the second member and extending upwardly toward the reaction mass member; and,
   wells in the upper and lower faces of the cylinder member positioned to receive the respective bumper studs, each well having a spring biased plate therein for contacting the ends of the respective bumper studs and resiliently limiting excess travel of the reaction mass member.

7. A portable seismic transducer assembly as defined in claim 4 wherein:
   the first member is bolted to the upper ends of the posts; and,
   the lower end of the piston member is bolted to the second member,
   whereby the bolts may be disconnected and the first member, the piston member and the reaction mass member removed from the assembly.

8. A portable seismic transducer assembly comprising:
   a vehicle having front and rear sets of wheels and a driveshaft extending longitudinally of the vehicle for driving one set of wheels;
   a base plate number for engaging the surface of the earth disposed below the driveshaft and between the front and rear wheels;
   four posts connected to the base plate member and extending upwardly, two on either side of the driveshaft, to a point above the driveshaft;
   a lower spider member rigidly interconnecting the four posts at intermediate points above the driveshaft, the lower spider member having an upwardly-facing recess substantially centered between the posts;
   an upper spider member bolted to and interconnecting the upper ends of the four posts, the upper spider member having a downwardly-facing recess substantially centered between the posts;
   a double-rod-end piston member having an upper rod the end of which is received in the downwardly-facing recess, a lower rod the end of which is received in the upwardly-facing recess, and a centrally disposed piston;
   first bolt means connecting the lower spider member to the piston member;
   second bolt means connecting the upper spider member to the piston member;
   a reaction mass reciprocally disposed around the piston member and forming a hydraulic cylinder around the piston whereby hydraulic fluid may be introduced to the cylinder to reciprocate the reaction mass relative to the piston member;
   a pair of journal sleeve means rigidly connected to the vehicle on opposite sides of the four posts;
   a column slidably received in each journal sleeve means for generally vertical sliding movement relative to the vehicle;
   a resilient vibration isolation means interconnecting the lower end of each column and the base plate member for applying a static load to the base plate and for lifting the base plate;

a hydraulic lift cylinder pivotally connected to each of the journal sleeve means;

a piston member slidably disposed in each of the cylinder members and pivotally connected to the top of the respective columns for raising and lowering the columns relative to the vehicle upon introduction of hydraulic fluid to the cylinder members;

a double-rod-end synchronizing cylinder pivotally connected to each journal sleeve means, each synchronizing cylinder having upper and lower hydraulic ports;

a double-rod piston member pivotally connected to each column and having a piston reciprocally disposed in each synchronizing cylinder whereby hydraulic fluid introduced through the upper and lower ports will be contained in the cylinder above and below the piston, respectively;

first conduit means interconnecting the upper port of one synchronizing cylinder and the lower port of the other synchronizing cylinder; and, second conduit means interconnecting the upper port of said synchronizing cylinder and the lower port of said one synchronizing cylinder.

9. A seismic transducer comprising:

an elongated base plate member for engaging the surface of the earth;

four posts connected to the base plate member and extending upwardly therefrom;

a lower spider member rigidly interconnecting the four posts at intermediate points of the posts, the lower spider member having an upwardly-facing recess substantially centered between the posts;

an upper spider member bolted to and interconnecting the upper ends of the four posts, the upper spider member having a downwardly-facing recess substantially centered between the posts;

a double-rod-end piston member having an upper rod the end of which is received in the downwardly-facing recess, a lower rod the end of which is received in the upwardly-facing recess, and a centrally disposed piston;

bolt means connecting the lower spider member to the piston member; and, a reaction mass reciprocally disposed around the piston member and forming a hydraulic cylinder around the piston whereby hydraulic fluid may be introduced to the cylinder to reciprocate the reaction mass relative to the piston member.

10. A seismic transducer comprising:

a base plate member for engaging the surface of the earth;

frame means consisting of at least two vertical members rigidly connected to said base plate member in spaced relationship;

first means rigidly connected across said vertical members at a point intermediate along their height;

second means rigidly connected across the tops of said vertical members; and a reaction mass member movably connected for reciprocation between said first and second means such that the center of gravity of said transducer is spaced a substantial distance above the base plate member and the rotational moment of inertia of said transducer about the base plate member is relatively higher, thus increasing the stability of the transducer when operating on sloping ground.

11. A portable seismic transducer for mounting on a vehicle having front and rear sets of wheels and a longitudinally extending drive shaft, comprising:

a base plate member resiliently connected to said vehicle for engaging the surface of the earth below said vehicle;

vibrator means including a reaction mass member for generating vertical-vibrations, said vibrator means being disposed above the level of said vehicle drive shaft; and frame means which are vertically extending and connected between said base plate member and said vibrator means on each side of said drive shaft such that vibrations are imparted into the earth as the vibratory forces are directed around said drive shaft.

12. A portable seismic transducer as set forth in claim 11 wherein said frame means comprises:

a pair of frame members connected to said base plate member for vertical extension on each side of said drive shaft;

first spider means rigidly connected between said frame members above said drive shaft and being secured to the bottom of said vibrator means; and second spider means rigidly connected between said frame members above said first spider means and being secured to the top of said vibrator means.

13. A portable seismic transducer as set forth in claim 11 which is further characterized to include:

lift means connected between each side of said vehicle and the respective side of said base plate member, said lift means being extendable to support the vehicle over said base plate member.

References Cited by the Examiner

UNITED STATES PATENTS

| | | | |
|---|---|---|---|
| 1,955,101 | 4/1934 | Sloan | 94—48 |
| 2,100,445 | 11/1937 | Bleu | 60—52 |
| 2,109,392 | 2/1938 | Bleu | 60—52 |
| 2,938,351 | 5/1960 | Brooks | 91—189 X |
| 3,070,960 | 1/1963 | Ternent | 60—10.5 X |
| 3,159,233 | 12/1964 | Clynch et al. | 181—.5 |
| 3,216,525 | 11/1965 | Fail et al. | 181—.5 |

BENJAMIN A. BORCHELT, *Primary Examiner.*

SAMUEL FEINBERG, *Examiner.*

G. H. GLANZMAN, *Assistant Examiner.*